Nov. 18, 1952     F. LYIJYNEN     2,618,581
TRIM PANEL AND METHOD OF MAKING THE SAME
Filed Dec. 9, 1948     2 SHEETS—SHEET 1
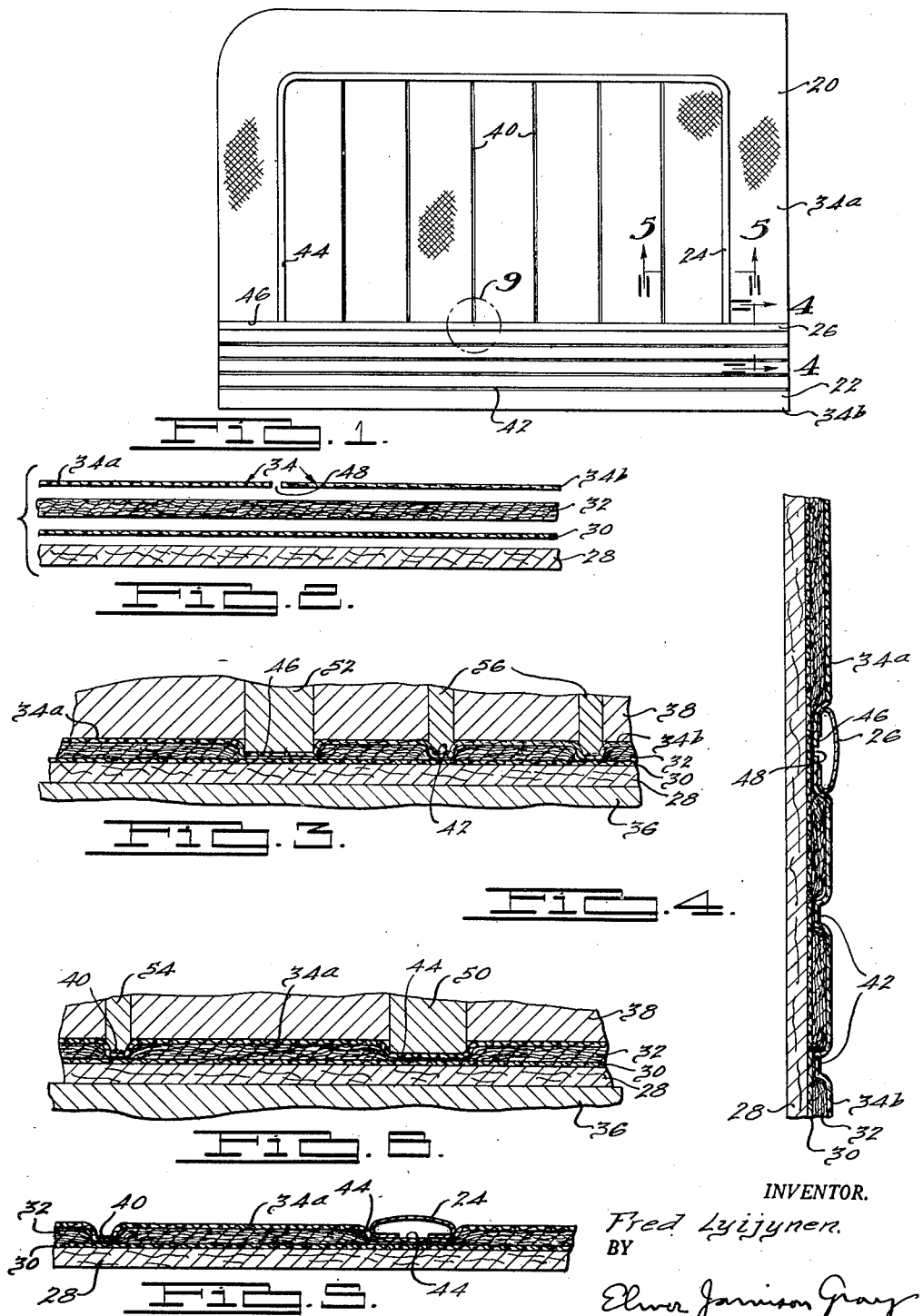
INVENTOR.
Fred Lyijynen.
BY
ATTORNEY.

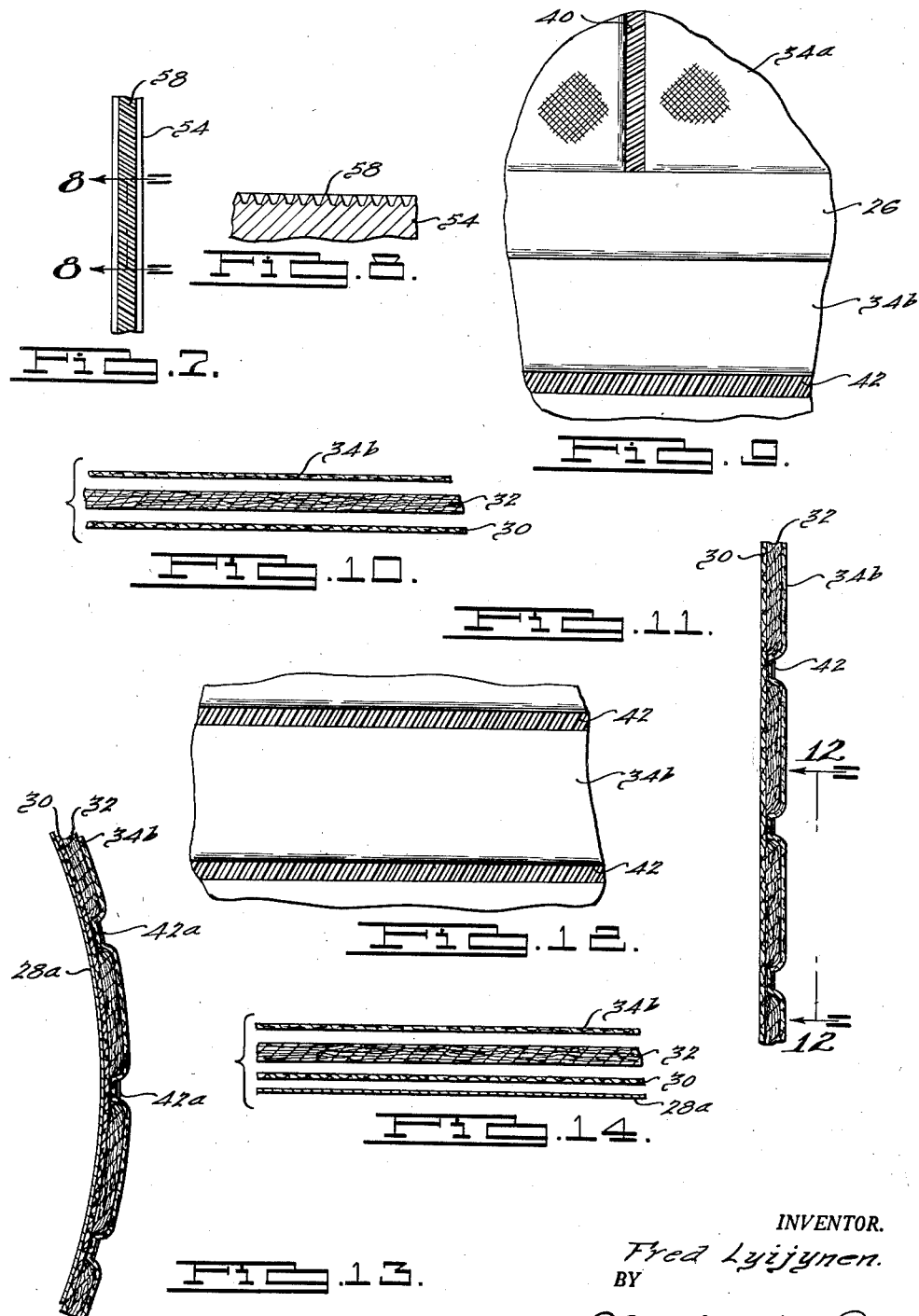

Patented Nov. 18, 1952

2,618,581

UNITED STATES PATENT OFFICE 2,618,581

TRIM PANEL AND METHOD OF MAKING THE SAME

Fred Lyijynen, Detroit, Mich., assignor to Briggs Manufacturing Company, Detroit, Mich., a corporation of Michigan Application December 9, 1948, Serial No. 64,410

6 Claims. (Cl. 154—106)

1

The present invention relates to ornamental panels and to a method of making the same, such panels being particularly useful as inner trim panels for various types of vehicle bodies, especially automobile bodies. However the present invention is well adapted for other uses and is susceptible for the fabrication of various panels, articles or structures intended for many different purposes.

A panel constructed in accordance with the present invention preferably comprises a number of superimposed sheets or layers of material consolidated or bonded together under heat and pressure through the medium of bonding agent comprising a thermosetting or thermoplastic resinous material. The laminations of the composite panel preferably include a foundation layer or board, which itself may be composed of one or a plurality of layers, and one or more relatively thin top or cover layers which may be treated for design or ornamental purposes. A portion or all of the panel area may be upholstered, as by employing a padding layer interposed between the cover and foundation layers.

One such panel suitable for trimming the inside of an automobile door comprises two contrasting sections including a lower non-upholstered kick-pad or kick-panel section, which may be of ornamental or decorative character and is ordinarily covered with a wear resistant outer or top sheet, such as fabric or artificial leather, and an ornamental upholstered upper section.

In fabricating a panel or other laminated structure in accordance with the present invention, the assembled foundation, padding and cover layers are laminated with a suitable thermosetting or thermoplastic bonding resin applied between one or more of the layers. Thereafter the laminations are bonded together between the heated platens of a press, particularly along predetermined lines or seams in accordance with a desired ornamental pattern. To this end, the platen confronting the top or outer panel layer is provided with a pattern forming die having a number of elevated ribs or raised portions arranged to emboss or impress a desired pattern of grooves or depressions into the outer layers of the panel. As the platens or die plates are pressed together in the bonding action, the ribs or elevations of the pattern forming die depress the outer and underlying panel layers tightly toward the foundation layer. The bonding resin, particularly at the depressed regions, is thus heated and compressed so as to permeate the adjacent layers of the panel, bonding the same permanently to each other and to the foundation layer along the grooves or depressions which effect an ornamental design embossed in the exterior surface of the panel.

A serious difficulty encountered in the practice outlined above is that slight variations in the thickness of the panel layers, or in the elevated facing of the pattern forming die, will result in highly magnified pressure variations on the panel at the depressed regions thereof during the bonding operation. This difficulty is particularly troublesome where the panel layers overlying the foundation layer are of considerable thickness, as in the case of upholstered panels. Thus, if one region of the compressed panel layers under the ribs or elevations of the pattern forming die is slightly thicker than an adjacent region, the thicker region will assume the major compressional force of the platens and a strong permanent bond will be made only at the thicker region. The pressure at the adjacent thinner portions of the panel will frequently be insufficient to effect a strong bond thereat. As a result, the padding and outer panel layers tend to pull away from the foundation layer along substantial portions of the grooves or depressions whereat a uniformly strong and permanent bond or seam is desired.

An object of the invention is to provide an improved panel and method for its manufacture wherein ornamental grooves or depressions are impressed into the covering material of the panel, and wherein a superior bond between the covering and the panel foundation is effected at the locality of the grooves or depressions; and in particular to provide such a panel and method for its manufacture whereby the panel may be economically fabricated from conventional materials by mass production methods.

Another and more specific object of the invention is to provide an improved panel of the foregoing character and a method for its manufacture wherein the bonding pressure is applied at a multitude of small sharply defined and closely spaced regions along the lines of the ornamental grooves or depressions, thereby achieving an ornamental knurled appearance along the ornamental grooves or depressions and also effecting a superior bonding action along the grooves or depressions by virtue of the closely spaced pressure regions.

In accordance with the embodiments of the invention, herein illustrated, the panel structure comprises an outer cover layer, a foundation and an intermediate padding layer, said cover and padding layers being compacted against the foundation at selected regions to provide depressed areas in which the cover layer along the bottoms of these areas is disposed below the cover layer in the regions adjoining said areas, the bottoms of said areas being additionally formed with closely spaced indentations at the locality of which the cover and padding layers are additionally compacted, the layers being adhesively bonded together along the bottoms of the depressed areas and indentations. The invention also contemplates a method of fabricating a laminated panel structure composed of an outer cover layer, a backing layer and an intermediate padding layer wherein depressed grooves are pressed under the influence of heat in the cover and padding layers so as to compact the same and bond the layers together along these grooves and wherein at the same time the cover and padding layers are additionally pressed and compacted so as to form relatively narrow substantially parallel knurl-like grooves in the bottom of the first named grooves and transversely thereof.

Other objects of this invention will appear in the following description and appended claims, reference being had to the accompanying drawings forming a part of this specification wherein like reference characters designate corresponding parts in the several views.

Fig. 1 is a top plan view of a trim panel constructed in accordance with one embodiment of the present invention.

Fig. 2 is an enlarged fragmentary exploded view in section illustrating the component parts of the panel shown in Fig. 1, showing substantially the component parts of Fig. 4 prior to the bonding operation.

Fig. 3 is a fragmentary sectional view illustrating the manner in which the component parts of Fig. 2 are bonded together.

Fig. 4 is a fragmentary enlarged section showing the component parts of Figs. 2 and 3 in the finished panel, taken in the direction of the arrows substantially along the line 4—4 of Fig. 1.

Fig. 5 is an enlarged fragmentary sectional view taken in the direction of the arrows substantially along the line 5—5 of Fig. 1.

Fig. 6 is a fragmentary sectional view illustrating the operation of bonding together the component parts illustrated in Fig. 5.

Fig. 7 is a fragmentary bottom view of the pressure exerting face of one of the pattern forming or embossing ribs of the compression die employed in the fabrication of the panel shown in Fig. 1.

Fig. 8 is a fragmentary-enlarged section taken in the direction of the arrows substantially along the line 8—8 of Fig. 7.

Fig. 9 is a fragmentary enlarged plan view taken from within the circle 9 of Fig. 1.

Fig. 10 is an exploded view in section illustrating the component parts of a panel produced in accordance with another embodiment of the present invention.

Fig. 11 is a fragmentary sectional view illustrating the component parts shown in Fig. 10, after the bonding operation.

Fig. 12 is a fragmentary elevation taken in the direction of the arrows substantially along the line 12—12 of Fig. 11.

Fig. 13 is a fragmentary sectional view through a panel illustrating still another embodiment of the present invention.

Fig. 14 is a fragmentary exploded view in section illustrating the component parts of the panel shown in Fig. 13, prior to the bonding operation.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A particular application of the present invention is illustrated by way of example in Figs. 1 through 9 wherein a trim panel of the type which may be used as part of the decorative interior for an automobile body, such as on the doors thereof, is shown in Fig. 1. Trim panels of this type are frequently fabricated with a main upper area 20, which may be covered with fabric of cloth overlying a layer of padding, and a lower rather narrow area 22, often termed a kick-pad and usually padded and covered with a layer of more durable material, such as carpeting, imitation leather, or a layer of fabric differing in color, appearance, or other characteristics from the upper layer covering the area 20. It is often the practice to attach ornamental metal moldings to the face of the panel. Accordingly, the panel shown in Fig. 1 is provided with an ornamental molding 24 secured to the area 20 inside the upper and lateral marginal edges thereof. A second molding 26 similar to the molding 24 is secured along the juncture between the areas 20 and 22. In the present instance, the moldings 24 and 26 are of channel form with inturned edges as shown in Figs. 4 and 5 and are preferably formed of bright metal. They are applied in any suitable manner and comprise no part of the present invention except to illustrate an application thereof.

In general, the trim panel shown and made in accordance with the present invention comprises a stiff foundation board 28, a comparatively thin loosely woven cloth or fabric sheet 30 overlying the foundation 28, a layer of padding or wadding 32 superimposed upon the sheet 30, and an outer facing sheet or cover layer indicated generally by the numeral 34 and including in the present instance the portions 34a and 34b for the trim panel areas 20 and 22 respectively. The covering 34a for the area 20 preferably comprises a cloth or fabric material. A particularly desirable covering which is employed and made feasible for the kick-pad area 22 in accordance with one application of the present invention comprises a tough layer or sheet of a vinyl type resin, such as vinyl acetal resin for example, or a vinyl ester resin such as a polyvinyl acetate, a polyvinyl chloride or a polyvinyl chloride-vinyl acetate.

Such vinyl resin sheeting is characterized by a pleasing appearance for decorative purposes, is highly wear resistant, and is generally less costly than cloth or fabric of comparable strength and decorative appear. Furthermore, as will be apparent from the following, such vinyl sheeting exhibits other properties which render it particularly suitable and desirable in the panel construction of the class herein involved. Nevertheless, the covering for the kick-panel section 22 may be of other material, such as a suitable fabric, carpeting, imitation leather, or the like. Likewise if desired the vinyl sheeting 34b may be employed to cover the panel area 20 in place of the fabric cover material 34a.

The foundation 28 and layers 30, 32 and 34 are assembled and laminated in superimposed relation as shown in Fig. 2. They are thereafter subjected to a pressing operation between the heated platens 36 and 38 of a press, Fig. 3, during which operation the layer or laminations are heated under pressure and consolidated or unified so as to bond the laminations together. In the present instance, the primary bond or seam between the laminations it maintained along ornamental lines defined by relatively deep indentations or grooves, such as the vertically extending grooves 40 in the upper panel area 20 and the horizontal grooves 42 in the kick-pad area 22; and the similar but broader molding receiving grooves 44 and 46 for the above mentioned molding strips 24 and 26 respectively. The arrangement of the grooves or indentations shown in Fig. 1 is purely for illustrative purposes. It will be apparent that the lines or localities at which the laminations or panel layers are pressed together so as to effect a bond therebetween may be varied as to configuration or otherwise in order to produce any desired pattern or design.

In assembling the laminations to provide the areas 20 and 22 of the panel, the foundation 28 and intermediate layers 30 and 32 are continuous to provide a backing for the cover layers 34a and 34b corresponding to the full area of the panel. The cover layer or sheets 34a and 34b are applied as separate sheets in the embodiment shown in Figs. 1 through 9, so that a gap or space 48 may exist between their adjacent edges. The gap 48 is closed in the finished panel by the molding 26 which is suitably bonded or otherwise secured within the groove 46 therefor.

The foundation layer or board 28 is preferably formed from a rigid sturdy material providing the desired backing or support for the remaining laminations of the panel. In some instances, the material of the foundation board or layer 28 may be made moisture resistant by impregnation with resin or an asphalt or bituminous material. In the present instance the trim panel, as intended for use on the interior of an automobile body, may utilize a heavy composition fiber board, such as masonite, which is not impregnated or treated for moisture resistant purposes.

The bonding agent used to consolidate the laminations of the panel along the grooves or depressions 40, and 44 in particular, may be contained entirely within the sheet 30. The latter preferably comprises a loosely woven fabric treated or impregnated with a bonding substance preferably in the form of a thermoplastic or a thermosetting resin, such as a phenol formaldehyde product, or any suitable phenolic resin, for example. Where a resin of this character is used as the bonding agent, the resin is preferably dissolved in a suitable volatile solvent and thereby converted into a varnish. The sheet 30 may be impregnated by immersion in the varnish so as to saturate the fibers of the sheet. By controlling the percentage of resin contained in the varnish, the amount of resin introduced into the sheet 30 may be readily controlled in order to produce the desired bonding action without the presence of excess resin. After impregnation, the sheet 30 is dried to expel the volatile solvent. The resinous material remaining in the sheet 30 is preferably partially reacted or polymerized so as to be capable of further action or curing or setting when subjected to heat and pressure between the platens 36 and 38 during the pressing or bonding operation.

It has been found that the use of the loosely woven fabric sheeting 30 as the matrix for the bonding resin permits a material increase in the rate of application of the resin and refinements in both the control over the quantity of the resin being applied and its uniform distribution over the panel area that are not otherwise obtainable by conventional methods. Furthermore, the fabric sheeting 30 readily permits uniform application of the bonding resin in comparatively small quantities per unit of area, permitting a reduction in the quantity of resin employed for certain bonding operations which require less bonding resin than the minimum that may be feasibly applied by comparable methods employing the customary resin impregnated blotting paper of absorbent cellulosic material. Accordingly, in the construction of such panels, the minimum quantity of resin per unit area required for optimum bonding efficiency and the attainment of a sturdy lasting bond may be uniformly applied between selected panel layers, as for example between the layers 28 and 32.

Many advantages of the present invention are not dependent upon the use of the resin imprenated fabric 30, so that the latter may be replaced in certain instances by the customary resin impregnated cellulosic material where desired. Likewise in certain instances, the resin may be applied in the form of the aforesaid varnish by spraying or brushing the same directly on selected layers of the panel prior to the bonding operation, as for example on the upper surface of the foundation 28 and on the under surface of the cover sheet 34. In particular, where the preferred vinyl type sheeting is employed for the cover layer 34b, a vinyl type bonding material or equivalent cement compatible with the vinyl layer 34b will necessarily be employed to bond the latter to the padding 32. In such instances, the vinyl type bonding material may be dissolved in a volatile solvent as described above and brushed or sprayed on the under surface of the layer 34b. Where desired, coating of the layer 34b may be avoided by mixing a vinyl type bonding agent with the phenolic type bonding agent in the varnish with which the layer 30 is impregnated. In such mixtures, the proportion of the phenolic type bonding material may vary from approximately 50% to approximately 20%, with the vinyl type bonding material varying correspondingly from approximately 50% to approximately 80%. Where flexibility is important, the smaller proportions of the thermosetting phenolic resin are employed because the latter increases the resulting stiffness of the panel after the bonding operation.

The wadding or padding layer 32 may comprise any suitable soft deformable material capable of being employed to cushion the outer surface of the panel. Cotton batting or multiple layers of crepe paper are satisfactory for this purpose. As discussed in more detail hereinafter, it has been found that a superior upholstered effect may be achieved by the employment of a fibrillar padding of comparatively low tensile or shear strength, such as multiple thin layers of soft crepe paper.

Referring to Fig. 3, the various laminations of the composite panel are assembled for the bonding operation and consolidated together under heat and pressure in a suitable press, which is preferably hydraulically actuated and adapted for pressing the aforementioned heated lower and upper platens 36 and 38 toward each other. The lower platen 36 is preferably plane to engage the plane outer surface of the foundation 28. The upper platen 38 is provided with a plurality of ribs or upset pattern forming portions raised from the platen face to impress or emboss the aforementioned depressed regions or grooves 40, 42, 44 and 46 into the panel face.

The ribs or pattern forming die elements of the platen 38 include the ribs 50 and 52 suitably shaped and arranged to engage the cover panel layer 34 and emboss therein the grooves 44 and 46 respectively, which subsequently receive the ornamental molding strips 24 and 26 respectively. Also provided by the platen 38 are the pair of orthogonal sets of parallel ribs or die members 54 and 56 suitably shaped and arranged to engage the cover layer 34 and depress the corresponding sets of ornamental grooves 40 and 42.

Upon operation of the press, the aforementioned pattern forming ribs 50, 52, 54 and 56 are impressed deeply into the cover layer 34 and underlying padding 32, compacting these layers together with the resin impregnated sheet 30 against the foundation 28 in accordance with a predetermined desired pattern. Along the resulting grooves or lines of pressure, the compressed and heated resinous bonding agent of the sheet 30 is caused to permeate the compressed wadding or padding 32 and to some extent the cover layer 34 so as to consolidate or bond these layers securely together at the compressed regions. Likewise, the resinous bonding agent will affect a permanent bond between the wadding layer 32, fabric 30 and foundation 28 along the grooves or indentations where pressure is applied by the ribs or raised die elements.

During the pressing operation, the temperature and pressure of the platens 36 and 38 are regulated by any suitable means so that the bonding resin in the sheet 30 is cured or brought to a final stage of reaction or polymerization. As a consequence, the layers of the panel are securely and permanently bonded together upon completion of the curing or reaction of the bonding resin, while substantial areas of the panel between the lines of pressure or grooves 40, 42, 44 and 46 remain uncompressed, giving the finished panel as a whole a soft upholstered effect ornamented by the embossed grooves or depressed regions. Upon completion of the bonding reaction and setting of the thermosetting bonding resin, the consolidated and bonded panel is removed from the press and completed upon insertion of the molding strips 24 and 26 into their respective grooves 44 and 46.

In the above connection, it is to be noted that the pattern forming ribs 50, 52, 54 and 56 are impressed deeply into the padding layer 32 during the bonding operation, Figs. 3 and 6. By virtue of the comparatively slight tensile or shear strength of the preferred fibrillar matting 32, such as the aforementioned multiple layers of soft crepe paper, the matting 32 is compacted tightly beneath the pattern forming ribs but is sheared along the edges of the latter. The fibers of the matting 32 apparently break down or are sheared along the edges of the pattern forming ribs, minimizing the tendency of the compressed matting 32 along the seams or lines of pressure to compress or mat downward the adjacent regions of the matting 32 whereat the full upholstered effect is desired. Accordingly, in comparison to conventional long fibered matting material, such as cotton batting for example, the preferred fibrillar crepe paper permits the formation of rather sharply defined shoulders along the various grooves 40, 42, 44 and 46, whereby a superior upholstered effect between the grooves or depressed regions is permitted with a minimum of padding material.

In a somewhat similar manner, the vinyl type resin cover layer 34b also contributes to a superior upholstered effect by minimizing the tendency to depress the upholstered regions of the panel adjacent the lines of pressure or grooves during the bonding operation. For example, the conventional cloth or fabric cover layer, such as the layer 34a, does not give or stretch appreciably during the bonding operation and accordingly tends to depress or carry downward the portions of the cover layer 34a adjacent the pattern forming ribs during the bonding operation. To a certain extent, this effect is minimized by applying the cloth layer 34a sufficiently loosely across the padding 32 prior to the bonding operation to allow for the subsequent depression of the cover layer 34a into the grooves 40. Such a procedure is inconvenient and is not entirely satisfactory. On the other hand, the preferred vinyl type resin sheeting 34b tends to stretch under the influence of the heat and pressure of the bonding operation and is readily depressed by the pattern forming ribs or die elements into the grooves or depressed regions with a minimum of disturbance to the adjacent portions of the vinyl layer 34b.

By application of the present invention thus far described, the economical fabrication of a superior panel for many purposes is achieved, wherein the feasible temperature range permitted for the bonding of the vinyl type resin outer layer 34b to the padding 32 is increased in many operations to approximately 350° F. without injury of the panel. Thus the temperature range of the bonding operation may be feasibly varied within the range of approximately 200° F. to approximately 350° F., in accordance with the particular requirements of the operation, permitting a substantial reduction in the time required for each bonding operation and a corresponding increase in production with consequent economies.

In some instances, difficulty is encountered in achieving a strong and lasting bond along the entire length of the seams or grooves 40, 42, 44 and 46. For example, slight variations in the resulting thickness of the panel layers after compression, or slight variations in the thickness of the pattern forming ribs of the die, frequently result in an undesirable uneven distribution of the bonding pressure along the said grooves or regions of depression. Slightly thicker regions of the panel layers receive an undue proportion of the bonding pressure of the pattern forming ribs or die elements, whereas slightly thinner adjacent portions of the panel are relieved of the bonding pressure. Thus the panel may be imperfectly or spottedly bonded along the length of the grooves. In order to minimize the objection of pressure variations along the line of the bond or seam and to assure proper impregnation of comparatively thick panel layers, such as a thick padding layer 32, without recourse to an excessive use of bonding resin, increased pressure between the platens 36 and 38 may be employed. However, the increased pressure frequently causes the pattern forming ribs or die elements to fracture or break through the vinyl type resin layer 34b.

These difficulties are avoided or minimized and the range of applicability of the present invention is materially increased by providing knurled or corrugated pressure exerting lower faces 58, Figs. 7 and 8, for the pattern forming die elements or ribs 50, 52, 54 and 56. As indicated in Fig. 8, the crests of the corrugated knurlings 58 provide a plurality of comparatively small and closely spaced pressure exerting regions. The knurling or corrugations 58 are preferably formed on the bias as shown, although it will be apparent from the following that the present invention is not dependent upon the specific knurled pattern employed and that other configurations of the pressure exerting faces of the die elements or ribs may be employed to provide a plurality of comparatively small and closely spaced pressure exerting regions.

By virtue of the knurled die faces 58, the pressure exerted between the platens 36 and 38 during a bonding operation is concentrated primarily at the crests of the various corrugations, amounting to approximately one-half the total area of the faces of the pattern forming ribs or die elements. Accordingly, for the same force exerted by the press, the pressure or force per unit area exerted by the crest of each corrugation 58 will be approximately double that which would otherwise be experienced with a die element or rib having a plane or smooth pressure exerting face. Obviously the pressure exerted during a bonding operation on the panel cover layer 34 at the trough of each corrugation will be appreciably less. Thus a distinctive ornamental knurled or corrugated effect will be embossed into the face of each depressed seam or groove 40, 42, 44, 46 as indicated in Fig. 9. In some instances, the corrugated or knurled effect along the grooves 44 and 46 may not be required, as where the molding strips 24 and 26 cover these grooves and assist in holding the outer panel layers against the foundation, rendering minor imperfections in the bonding along these grooves unobjectionable.

A primary and efficient bonding action is assured along the length of the various grooves or depressed regions at the closely spaced pressure areas underlying the crests of the corrugation 58, regardless of minor variations in the thickness of the padding 32 or the other layers of the panel. Substantial variations in the thickness of the compressed panel layers up to at least two hundredths of an inch will not materially interfere with the efficiency of the bonding operation. Furthermore, by applying the optimum bonding pressure at a plurality of closely spaced points, any portions of the panel elements that are not adequately bonded to each other and to the foundation 28 will be closely bounded by strongly bonded regions on either side thereof, so that the unbonded regions, if any, will be unobjectionable and in fact not ordinarily noticeable.

The employment of the knurled or corrugated die faces 58, substantially doubling the effective bonding pressure at said crests, also assures that the bonding resin supplied by the fabric or sheet 30 will efficiently permeate the panel layers 32 and 34 at said crests. Thus a strong bond is assured with a minimum use of bonding resin and an appreciable saving in the production cost for panels of the foregoing character is permitted by decreasing the amount of bonding resin required for an optimum bonding effect. The feasibility and range of application of the fabric impregnated layer 30 is increased and an upholstered panel having a padding layer 32 of increased thickness is permitted without a corresponding increase in the quantity of bonding resins required to permeate the thicker padding.

Still another advantage gained from the construction shown is that, by reducing the overall pressure required between the platens 36 and 38 for a bonding operation, the use of the vinyl type resin layer 34b is made particularly feasible. The danger of rupturing or tearing the vinyl layer 34b during the bonding operation is so greatly reduced that platen temperatures of 350° F. to approximately 375° F. may be readily employed in many instances, assuring optimum speed in the bonding reaction and materially increased production and decreased costs.

Another embodiment of the present invention is shown by way of example in Figs. 10, 11 and 12 wherein the padding 32 and vinyl resin cover layer 34b are bonded directly to the resin impregnated fabric sheet 30. In this instance, the sheet 30 preferably comprises a tough loosely woven cloth layer impregnated with the bonding agent as described above. This type of panel is particularly suitable for use where flexibility is required. The preferred cloth or fabric impregnated sheet 30 adds sufficient strength and toughness to the panel structure to permit elimination of the customary foundation layer 28 and accordingly renders panels of this nature practicable and useful. Important economies in the fabrication of a tough pliable trim panel are thus permitted by the incorporation of both the foundation and the matrix for the bonding resin within a single layer. At the same time the advantages and economies of supplying the bonding resin in an accurately controlled quantity within the fabric 30 in accordance with the requirements of the bonding operation are preserved.

The layers 32 and 34 of the panel shown in Figs. 10 through 12 are superimposed upon the resin impregnated sheeting 30 and the assembled layers are consolidated or bonded together between the platens 36 and 38 and along depressed seams or grooves, such as the grooves 42, in substantially the manner described above. The pressure exerting faces of the pattern forming dies or ribs are preferably knurled or corrugated as shown in Figs. 7 and 8, so as to emboss a knurled pattern along the grooves or seams 42 as indicated in Fig. 12.

Still another important advantage derived from the superior bonding efficiency permitted by the preferred construction shown, and in particular by use of the knurled pressure exerting ribs or dies, is the feasibility of bonding the various panel layers to a metallic foundation or backing substituted for the foundation 28, as illustrated in Figs. 13 and 14. In this instance the panel layers 30, 32 and 34 are bonded directly to a sheet metal foundation 28a, by substantially the same bounding technique outlined above, to provide a trim panel having structural strength and being adapted for use in a variety of situations wherein a structural element requires a decorative trim.

As indicated in Fig. 13, the bonded panel may be readily flexed or bent to a desired shape so as to comprise a molding or structural element for a vehicle body, for example, eliminating the customary backing or foundation 28 and the necessity of securing the same to the structural element for which the trim is desired. The foundation 28a may comprise the structural metal panel for the vehicle door, for example, to which the panel layers 30, 32 and 34b are bonded directly. In this connection the metallic foundation 28a need not be a plane structural element and may be preformed in many instances to the desired shape of the final structural element prior to bonding of the layers 30, 32 and 34b thereto. The seam or bond between the various panel elements and the metal foundation 28a is effected along a plurality of depressed seams or grooves 42a with the padded or upholstered regions between the seams. Although the grooves 42a need not be knurled in particular situations, the bond along a knurled seam or groove 42a is usually preferred since the bonding resin cannot permeate the hard metallic surface of the foundation 28a. The increased bonding pressure effected at the crests of the knurls or corrugations assures a positive contact and stronger bond between the foundation 28a and the superimposed layers.

By virtue of the employment of the vinyl type resin outer or cover layer 34b and the fibrillar matting composed of multiple layers of soft crepe paper, an optimum upholstered effect is achieved with a minimum of expense and material which is particularly desirable to cover the hard metallic foundation 28a and to prevent or deaden metallic rumbling or vibratory sounds from the panel when the vehicle is driven over rough roads. However, other suitable cover layers may be employed where desired. Likewise, it is believed to be readily apparent that the application or use of the panel structure shown in Figs. 13 and 14 is not limited to vehicular body constructions and is readily adapted for other structural uses.

I claim:

1. A panel structure comprising an outer cover layer, a foundation and an intermediate padding layer, said cover and padding layers being compacted against the foundation at selected regions to provide depressed areas in which the cover layer along the bottoms of said areas is disposed below the cover layer in the regions adjoining said areas, the bottoms of said areas being additionally formed with closely spaced indentations at the locality of which said cover and padding layers are additionally compacted, and said layers being bonded together along the bottoms of said depressed areas and indentations, the thickness of the cover and padding layers between the surface of the foundation and the bottoms of said indentations being less than the thickness of said cover and padding layers at the bottoms of said depressed areas adjacent said indentations.

2. A panel structure comprising an outer cover layer, a foundation and an intermediate padding layer, said cover and padding layers being compacted against the foundation at selected regions to provide depressed areas in which the cover layer along the bottoms of said areas is disposed below the cover layer in the regions adjoining said areas, the bottoms of said areas being additionally formed with a series of relatively narrow spaced substantially parallel grooves at the locality of which said cover and padding layers are additionally compacted, said layers being bonded together along the bottoms of said areas and grooves, the thickness of the cover and padding layers between the surface of the foundation and the bottoms of said grooves being less than the thickness of said cover and padding layers at the bottoms of said depressed areas adjacent said grooves.

3. A laminated panel structure comprising an outer cover layer, a backing layer and an intermediate padding layer, said cover and padding layers being depressed at selected regions to provide grooves in which the cover layer along the bottoms of the grooves is disposed below the cover layer in the regions immediately adjacent to said grooves, the bottoms of said grooves being pressed to provide additionally a series of closely spaced indentations in the cover layer and said layers being bonded together at the locality of said grooves and indentations, the thickness of the cover and padding layers between the surface of the backing layer and the bottoms of said indentations being less than the thickness of the cover and padding layers at the bottoms of said grooves adjacent said indentations.

4. A laminated panel structure comprising an outer cover layer, a backing layer and an intermediate padding layer, said cover and padding layers being compacted and depressed at selected regions to provide grooves in which the cover layer along the bottoms of the grooves is disposed below the cover layer in the regions immediately adjacent to said grooves, the bottoms of said grooves being additionally knurled to compact said cover and padding layers and provide a series of closely spaced parallel grooves extending transversely of said first named grooves, and said layers being bonded together at the locality of said first and second named grooves, the cover and padding layers being compacted against the backing layer a greater amount at said second named grooves than at said first named grooves.

5. In the method of fabricating a laminated panel structure composed of an outer cover layer, a backing layer and an intermediate padding layer, the steps of laminating said layers with a bonding agent applied between selected layers, applying heat and pressure to said layers to form depressed areas in which the cover layer in said areas is compacted against the backing layer and disposed below the cover layer in the regions adjoining said areas and in which said layers are bonded together along the bottoms of said areas, and simultaneously and additionally compacting substantially only said cover and padding layers by forming closely spaced indentations in the bottoms of said areas.

6. In the method of fabricating a laminated panel structure composed of an outer cover layer, a backing layer and an intermediate padding layer, the steps of laminating said layers with a bonding agent applied between selected layers, pressing under the influence of heat depressed grooves in said cover and padding layers to compact the same and bond said layers together along said grooves, and at the same time additionally pressing and further compacting substantially only said cover and padding layers by forming relatively narrow substantially parallel knurl-like grooves in the bottoms of said first named grooves and transversely thereof.

FRED LYIJYNEN.

REFERENCES CITED

The following references are of record in the file of this patent:

UNITED STATES PATENTS

| Number | Name | Date |
|---|---|---|
| 2,048,895 | Rosen | July 28, 1936 |
| 2,053,144 | Gowdy | Sept. 1, 1936 |
| 2,113,128 | Cunnington | Apr. 5, 1938 |
| 2,226,181 | Ridderstrom | Dec. 24, 1940 |
| 2,227,212 | Beck | Dec. 31, 1940 |
| 2,261,983 | Ford | Nov. 11, 1941 |
| 2,273,833 | Carpenter | Feb. 24, 1942 |
| 2,287,159 | Zinser | June 23, 1942 |
| 2,291,935 | Woodall et al. | Aug. 4, 1942 |
| 2,322,226 | Cunnington | June 22, 1943 |
| 2,331,054 | Shively | Oct. 5, 1943 |
| 2,369,658 | Burns | Feb. 20, 1945 |
| 2,504,874 | Prance | Apr. 18, 1950 |
| 2,578,709 | Lyijynen | Dec. 18, 1951 |